United States Patent [19]

Mukherjee et al.

[11] Patent Number: 5,429,461

[45] Date of Patent: Jul. 4, 1995

[54] MACHINING APPARATUS AND WORK TABLE ASSEMBLY THEREFOR

[75] Inventors: Iyoti Mukherjee; August S. Fabel, both of Sartell, Minn.

[73] Assignee: Komo Machine, Incorporated, Sauk Rapids, Minn.

[21] Appl. No.: 957,211

[22] Filed: Oct. 5, 1992

[51] Int. Cl.⁶ ............................................. B23Q 5/44
[52] U.S. Cl. ................................. 409/163; 269/60; 408/70; 409/219; 409/241; 29/33 P
[58] Field of Search ............... 409/201, 219, 238, 136, 409/151, 163, 189, 145, 146, 158, 164, 172, 174, 197, 161, 173; 408/234; 51/165.71; 483/13; 29/33 P, 563; 269/60, 203

[56] References Cited

U.S. PATENT DOCUMENTS

| 4,185,376 | 1/1980 | Johnstone | 409/136 X |
| 4,313,478 | 2/1982 | Suzuki | 409/201 X |
| 4,984,351 | 1/1991 | Matsuyama et al. | 29/338 X |
| 5,044,486 | 9/1991 | Kitamura | 29/338 X |
| 5,054,175 | 10/1991 | Date | 29/338 |

FOREIGN PATENT DOCUMENTS

3055140  3/1991  Japan ........................ 408/70

Primary Examiner—Z. R. Bilinsky
Attorney, Agent, or Firm—Dorsey & Whitney

[57] ABSTRACT

An apparatus for forming selected machining functions relative to a workpiece comprising a machine carriage having one or more machining spindles and a work table assembly having a pair of work tables, a shuttle assembly selectively moveable along the table movement axis and a connect/disconnect mechanism associated with each of the work tables for selectively aligning and connecting and disconnecting the work tables relative to the shuttle. The present invention also relates to a work table assembly for use with a machining apparatus.

6 Claims, 6 Drawing Sheets

MACHINING APPARATUS AND WORK TABLE ASSEMBLY THEREFOR

BACKGROUND OF THE INVENTION

1. Field of the Invention

The present invention relates generally to a machining apparatus for performing repetitive machining operations on a workpiece, and more particularly, to a computer controlled machining apparatus and associated work table assembly. The invention also relates to an improved work table assembly for use with a computer controlled machining apparatus.

2. Description of the Prior Art

Machining apparatus, and more particularly, computer controlled machining apparatus or machining centers currently exist in the art. Such apparatus or machining centers are designed to perform repetitive machining operations on a workpiece supported by a work table. Examples include the computer controlled machining centers manufactured and sold by Komo Machine, Inc. of Sauk Rapids, Minn. under the trademarks VR508Q, VR805Q, and VR1005Q. Each of these machining centers includes a support base and a single work table mounted on the base to support the workpiece for reciprocal movement along the table movement axis. Each machining center also includes a machine carriage and a plurality of spindles or machine heads with mechanisms for moving the same along horizontal motion and vertical motion axes. Each machine head is provided with a work tool or bit to perform the desired machining operation on the workpiece.

Machining centers are also available in which the work table assembly includes a pair of independently moveable side-by-side work tables. One of these includes a single drive mechanism with a means in the form of a shear pin type arrangement for connecting the work tables to the drive mechanism. Most twin work table assemblies, however, embody a separate drive mechanism for each work table.

While the above described machining centers and associated work tables are satisfactory for many applications, various limitations exist. One limitation of single work table systems is the fact that significant down time exists during the time that finished workpieces are removed from the work table and replaced with new, unmachined workpieces. This downtime adversely affects the production capability or efficiency of the machining center, and thus the cost of the machined workpieces as well. Although this disadvantage can be overcome to some extent with the twin work table systems described above, disadvantages still exist. For example, for those systems embodying separate drive mechanisms for each work table, limitations include expense and system complexity. Further, difficulties arise when trying to synchronize movements of the two tables due to following error. For the system embodying a single drive mechanism, accuracy of work table alignment and positioning is a problem.

Accordingly, there is a need in the art for an improved computer controlled machining center and associated work table in which the down time resulting from workpiece changeover can be substantially reduced or eliminated and which is cost effective and provides for accurate work table alignment and positioning.

SUMMARY OF THE INVENTION

In contrast to the prior art, the present invention relates to an improved machining center and an associated work table assembly in which the down time resulting from workpiece changeover can be substantially reduced or eliminated. At the same time the machining center of the present invention is cost effective and provides for accurate table alignment. This can be accomplished using the apparatus of the present invention without sacrificing any of the other features of present machining centers.

More specifically, the machining center or apparatus of the present invention, like those of the prior art, is provided with a support base, one or more machine heads or spindles mounted to the machine carriage and a means for selectively moving the heads along the horizontal and vertical axes relative to a supported workpiece. Movements of the above components, together with the operation of the machine heads and associated work tools is controlled by an appropriate programmable computer controlled mechanism known in the art.

However, unlike the prior art, the machining center or apparatus of the present invention includes an improved work table assembly for supporting the workpieces. This improved work table assembly includes a pair of side-by-side, independently moveable work tables. Each of the work tables is independently mounted onto the support base for independent and selective movement along the table movement axis.

Associated with the pair of work tables is a centrally positioned shuttle assembly and a single transport means for selectively moving the shuttle assembly along the table movement axis. Each of the work tables is provided with a connect/disconnect means for selectively connecting and disconnecting the work tables from the shuttle assembly. With such a mechanism, either work table or both work tables may be selectively connected to, and thus moved along the table movement axis by the shuttle assembly. Preferably, each of the connect/disconnect means includes both an alignment means for properly aligning the corresponding work table with the shuttle assembly and a brake or clamp means for substantially transferring the load between the corresponding work table and the shuttle assembly.

A control means, and preferably a programmable computer numerical control means, is provided for controlling the selective connection and disconnection of each of the work tables relative to the shuttle assembly and the selective movement of the shuttle assembly. Such means in turn selectively controls movement of the work tables along the table movement axis.

Accordingly, it is an object of the present invention to provide an improved machining center in which down time resulting from workpiece change over can be significantly reduced or eliminated, without losing accuracy of positioning and repeatability.

Another object of the present invention is to provide a machining center having an improved work table assembling comprising of a pair of work tables independently and selectively movable along the table movement axis and a single transport means facilitating such movement.

A further object of the present invention is to provide an improved work table assembly for a machining center or apparatus as described above.

A still further object of the present invention is to provide an improved work table assembly for a machining center having an improved connect/disconnect means for selectively connecting each of a pair of work tables to a selectively controlled shuttle assembly.

These and other objects of the present invention will become apparent with reference to the drawings, the description of preferred embodiment and appended claims.

DESCRIPTION OF THE PREFERRED EMBODIMENT

Figure 1:
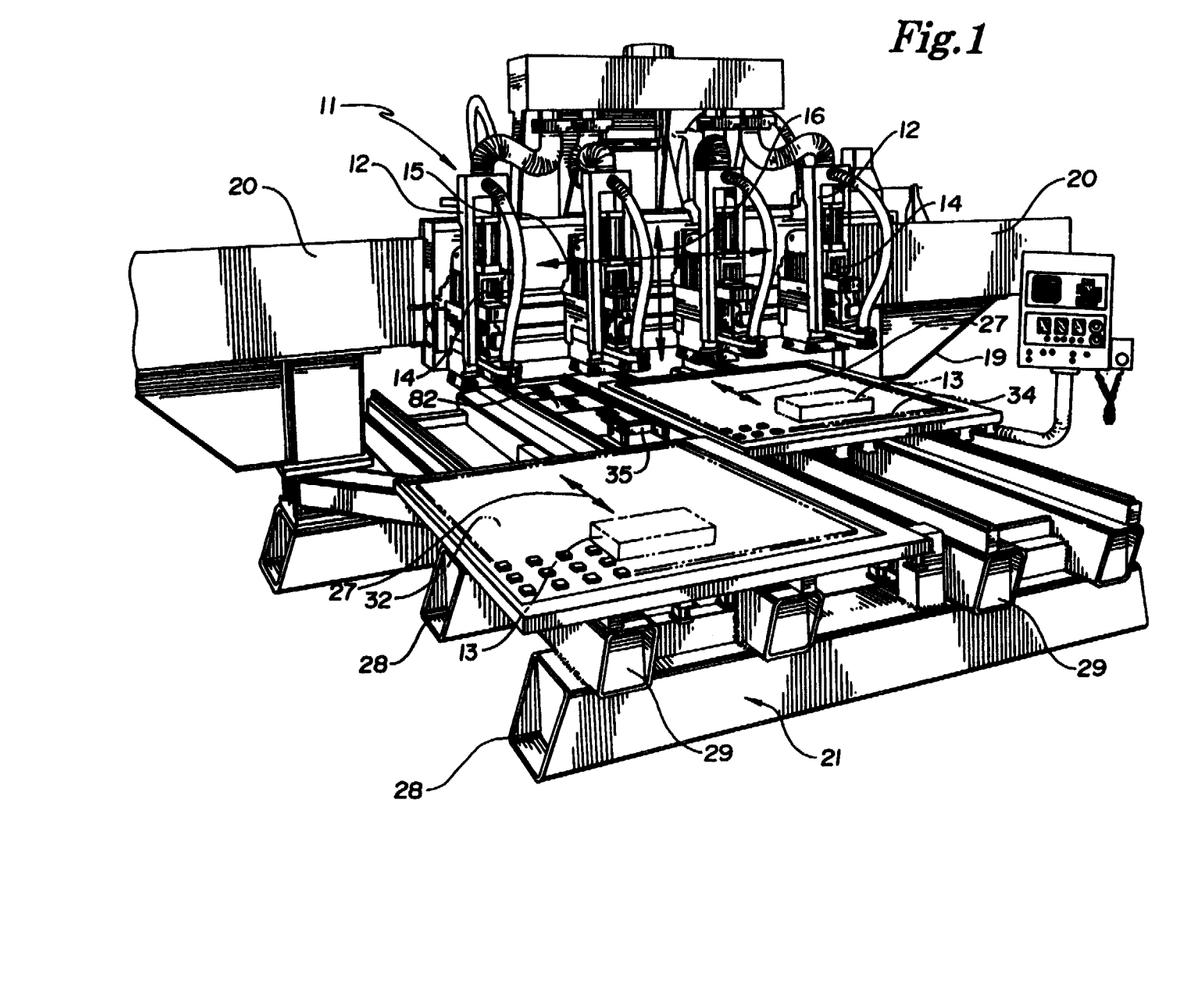
FIG. 1 is a perspective view of the machining apparatus of the present invention.
Figure 2:
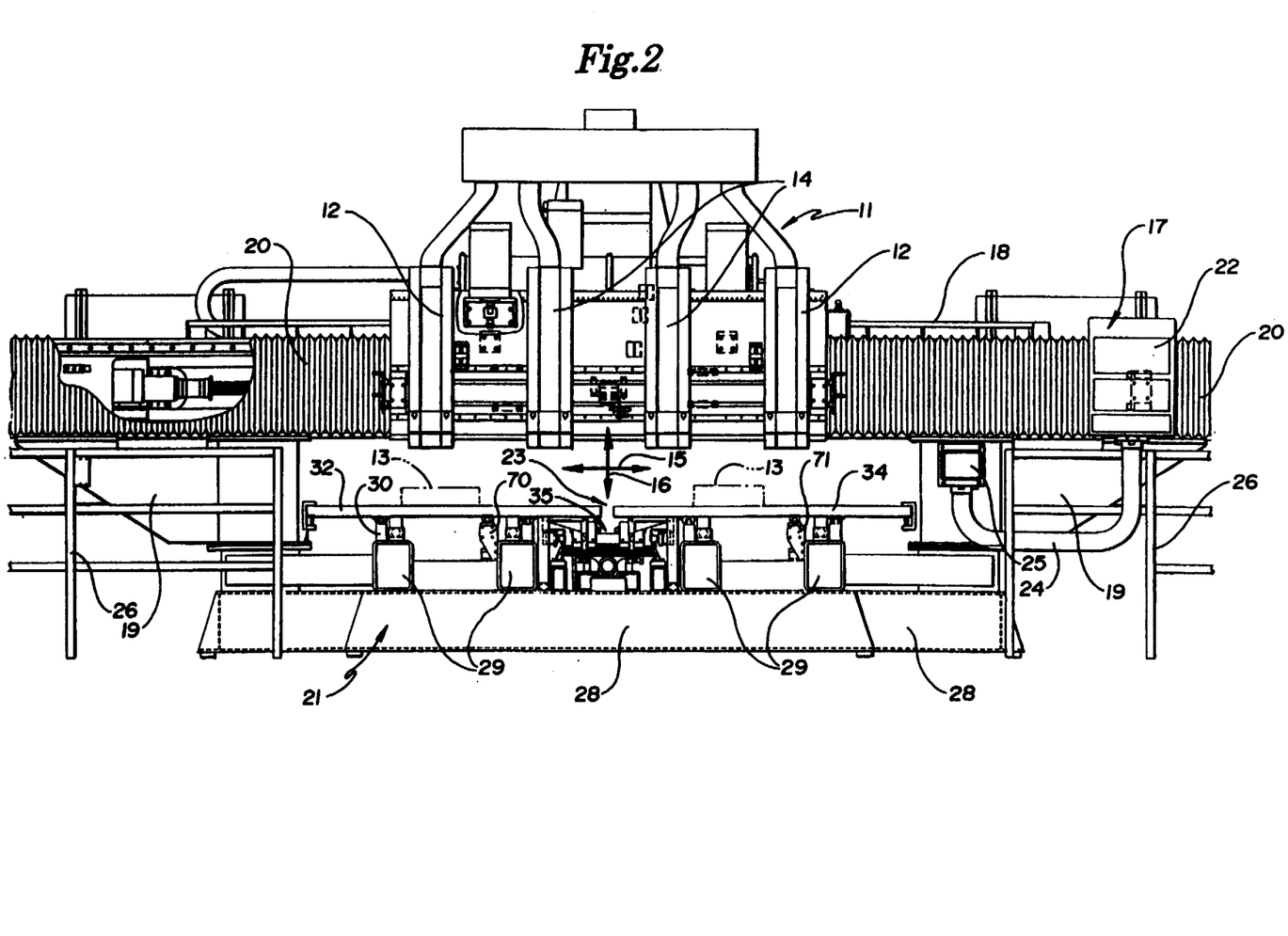
FIG. 2 is a front elevational view of the machining apparatus of the present invention showing the improved work table assembly.

The present invention relates generally to an apparatus commonly known as a machining center or machining apparatus designed to repetitively perform a variety of selected machining functions relative to a workpiece supported on a work table. The invention also relates to an improved work table assembly for use with such a machining apparatus. FIGS. 1 and 2 generally illustrate the machining apparatus of the present invention, while FIGS. 3-12 illustrate the improved work table assembly of the present invention and the details thereof.

Throughout the specification, the terms "machining" or "machining functions" are used in connection with the description of the present invention. It is intended in such terms be used in their broadest sense to define various functions or operations such as drilling, routing, shaping, milling or the like which can be performed on a workpiece. The terms "x" axis, "y" axis and "z" axis will also be used throughout the specification and claims. Generally the "x" and "y" axes are horizontally disposed and define horizontal movement, while the "z" axis is vertically disposed and defines vertical movement. For the machining center of the present invention, unless otherwise indicated, movement along the "x" axis defines lateral movement of the gantry arm or machine carriage assembly in a horizontal plane, movement along the "y" axis defines front-back or back-front movement of one or both work tables in a horizontal plane at right angles or orthogonal to the "x" axis, and movement along the "z" axis defines vertical movement of the spindles at right angles or orthogonal to both the "x" and "y" axes.

Referring first to FIGS. 1 and 2, the machining apparatus of the present invention generally includes a support base 21, a work table assembly 23, a machine carriage assembly 11 and control means 17. The work table assembly includes a pair of work tables 32 and 34 for supporting one or more workpieces 13 for movement along the "y" axis as illustrated by the directional arrow 27 of FIGS. 1 and 3. The machine carriage assembly 11 is mounted for movement along the "x" axis illustrated in FIGS. 1 and 2 by the directional arrow 15. The machine carriage 11 includes a plurality of "z" axis carriages 12 with the carriage 11 along the "x" axis and which are moveable together and independently along the "z" axis. In FIGS. 1 and 2, the "z" axis is illustrated by the directional arrow 16. Each of the "z" axis carriages 12 carries a work tool or spindle 14. Each spindle 14 includes means for receiving a work bit such as a drill, router, or milling bit for performing a desired machining function on the workpiece 13.

The machine carriage assembly 11 is mounted to the support frame 18 which is in turn supported on a pair of support numbers 19, 19 positioned on opposite sides of the carriage 11. The support members 19, 19 are in turn connected with, and form a part of, the base 21. Disposed on each side of the machine carriage 11 is a protective bellows structure 20, 20 which protects the mechanism for moving the carriage 11 along the "x" axis 15. A pair of free standing safety rails 26,26 are positioned on each side of the apparatus to prevent inadvertent contact by a user.

The control means 17 is housed within a control box 22 positioned on one side of the carriage 11. A control conduit 24 extends from the box 22 to a distribution box 25 positioned on one of the support members 19. Control signals for the apparatus are provided from the control box 22, through the conduit 24, to the distribution box 25 and then via internal wiring to various switches, actuators, etc. within the apparatus. The control means 17 comprises a computer control for controlling the selected movement of the carriages 11 and 12 and thus the spindles 14 along the "x" and "z" axes relative to the workpiece 13. The control means 17 also controls the various movements of the work table assembly as described below as well as providing all the electrical needs of the apparatus. Although a variety of controls can be used, the preferred embodiment contemplates a control unit manufactured by General Electric/Fanuc and known as the GE Fanuc control unit OMA, OMC. The control unit is programmable to meet the desires of the apparatus user.

The machine carriage assembly 11 and its associated mechanisms including the "z" axis carriages 12, control means 17, the spindles 14 and the various mechanisms for selectively moving the same along the "x" and "z" axes are available in the art. Accordingly, such apparatus and the details thereof are within the knowledge of the skilled artisan and the same is incorporated in the present disclosure.

Figure 3:
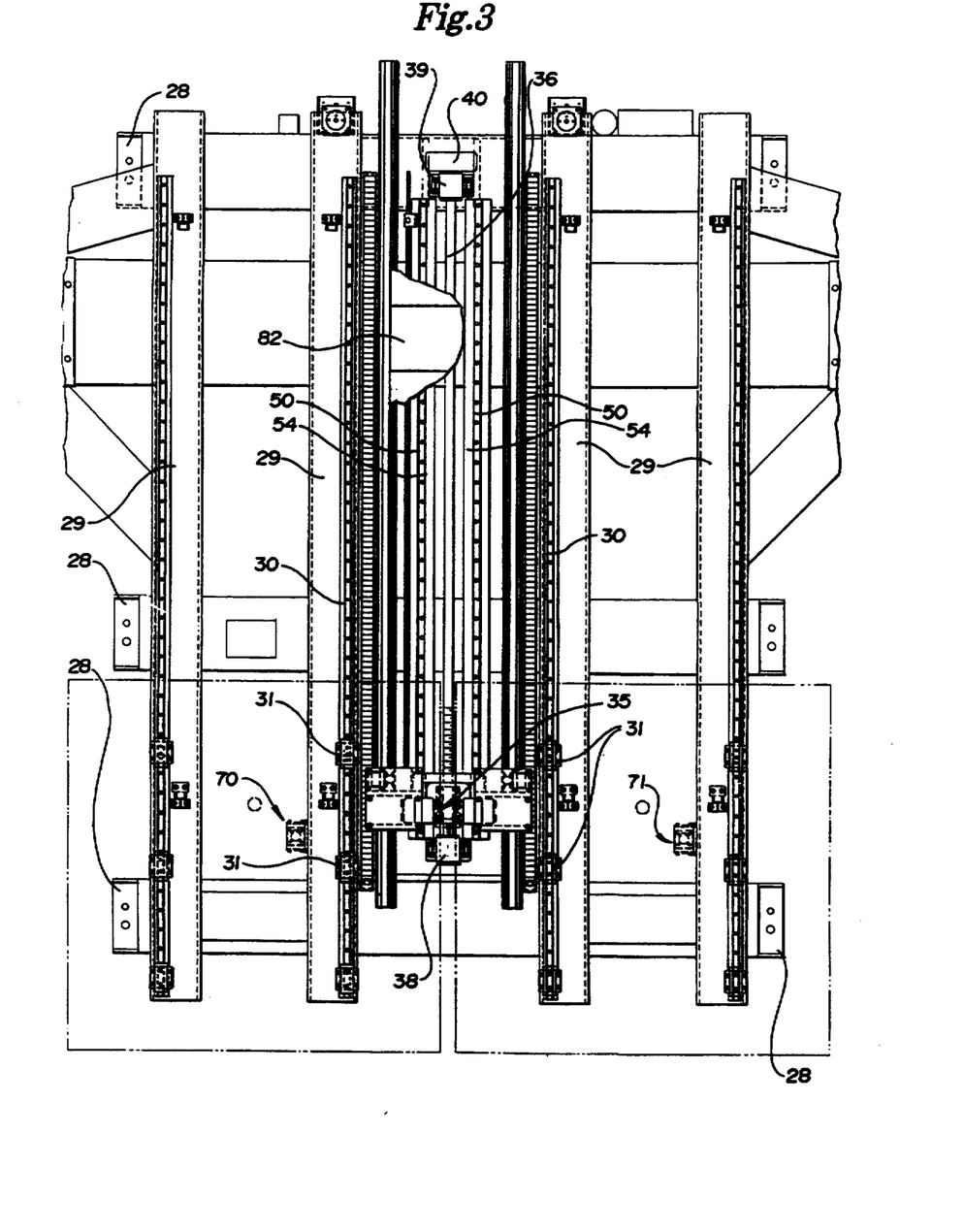
FIG. 3 is a top elevational view of the support base and shuttle assembly of the machining apparatus of the present invention with the work table shown in phantom and with certain parts broken away, for clarity.

As illustrated best in FIGS. 1, 2, and 3, the base 21 includes a plurality of generally parallel laterally extending lower support beams 28 and a plurality of generally parallel upper support beams 29 disposed on top of the beams 28 and at right angles thereto. Each of the support beams 29 carries an elongated support or linear guide rail 30 for supporting one of the pair of work tables 32 and 34. Specifically, the two support rails 30,30 on the left-hand side of the apparatus in FIGS. 2 and 3 support the work table 32, while the two support rails 30,30 on the right hand side of FIGS. 2 and 3 support the work table 34. Connected with the bottom side of each of the work tables 32 and 34 are a plurality of slides 31 which cooperate with, and are adapted for sliding movement along the linear guide rails 30. Although it is contemplated that various mechanisms can be used to support the work tables 32 and 34 and guide them in movement along the "y" axis, the preferred embodiment of the present invention embodies a linear motion system in which the slides 31 interface with and are supported on, the rails 30 by a plurality of linearly disposed ball bearings.

Each of the work tables 32 and 34 is mounted on its respective support rails 30 so that each is movable independent of the other along the "y" axis. As illustrated best in FIGS. 2 and 3, the work tables 32 and 34 are positioned in a side-by-side relationship, at the same vertical level, and each is adapted for supporting one or more work pieces 13. In the preferred embodiment, each of the work tables 32 and 34 are precision machined, two inch cast aluminum tables. Each table 32 and 34 is also provided with means known in the art for retaining the workpieces 13 in a fixed position relative to the table during performance of the machining functions.

Positioned between and below the work tables 32 and 34 is a shuttle assembly 35. The shuttle assembly 35 is selectively connectible to the work tables 32 and 34 and is selectively movable along the "y" axis 27 as will be described below. Associated with the shuttle assembly 35 is a transport means for selectively moving the shuttle assembly 35 along the "y" axis. As shown best in FIGS. 3 and 7, the transport means of the preferred embodiment includes a ball screw mechanism comprising an elongated, rotatable screw 36 extending a substantial portion of the length of the apparatus. The screw 36 is supported for rotation at its forward and rearward ends by bearing blocks 38 and 39, respectively. A mechanism 40 is provided at the rearward end for selectively rotating the screw 36. In the preferred embodiment, the mechanism 40 includes a brushless servo motor.

Figure 7:
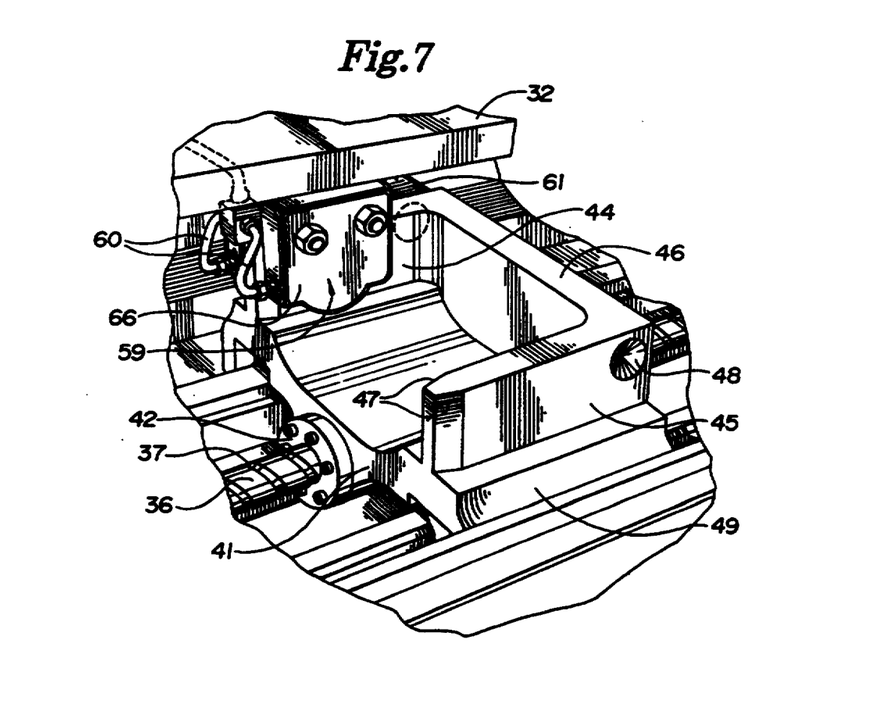
FIG. 7 is a perspective view of the shuttle assembly and one of the connect/disconnect mechanisms showing connection between the shuttle assembly and the connect/disconnect mechanism.

As illustrated best in FIG. 7, the screw 36 is provided with a spiral groove 37 which is adapted for engagement by a ball or other member having corresponding grooves. Ball bearings or other bearing means are disposed within the grooves of the ball and the screw in a manner known in the art. The ball is incorporated within and carried by the shuttle assembly 35. Thus, as the screw 36 is rotated, the shuttle assembly 35 moves along the screw 36, and thus along the "y" axis 27.

Figure 4:
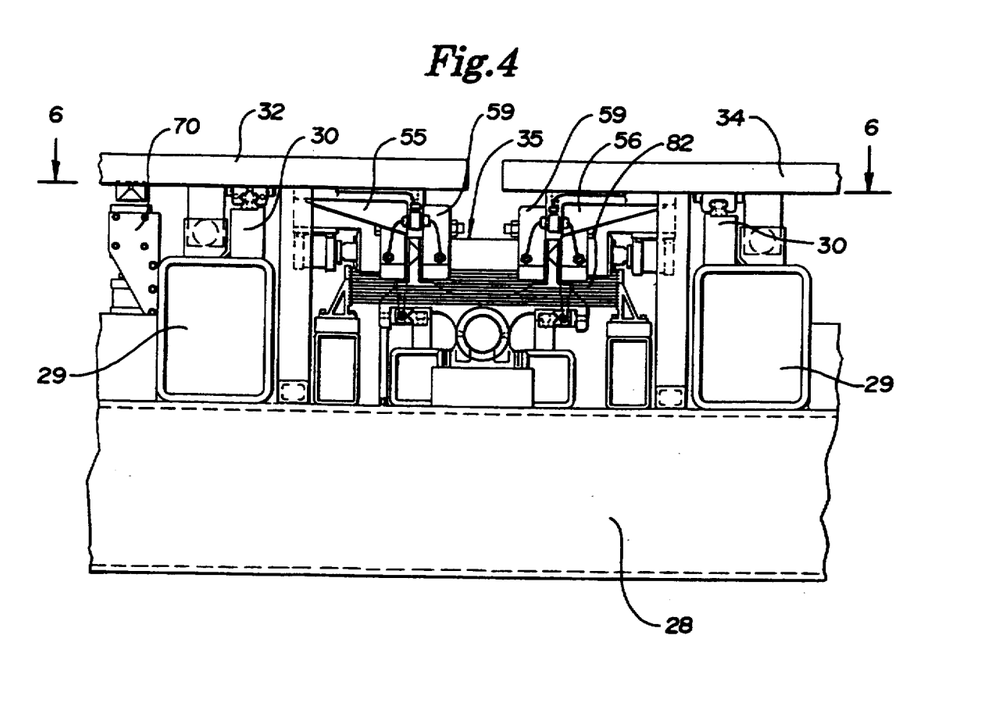
FIG. 4 is a front elevational view of a portion of the improved work table assembly of the present invention.
Figure 5:
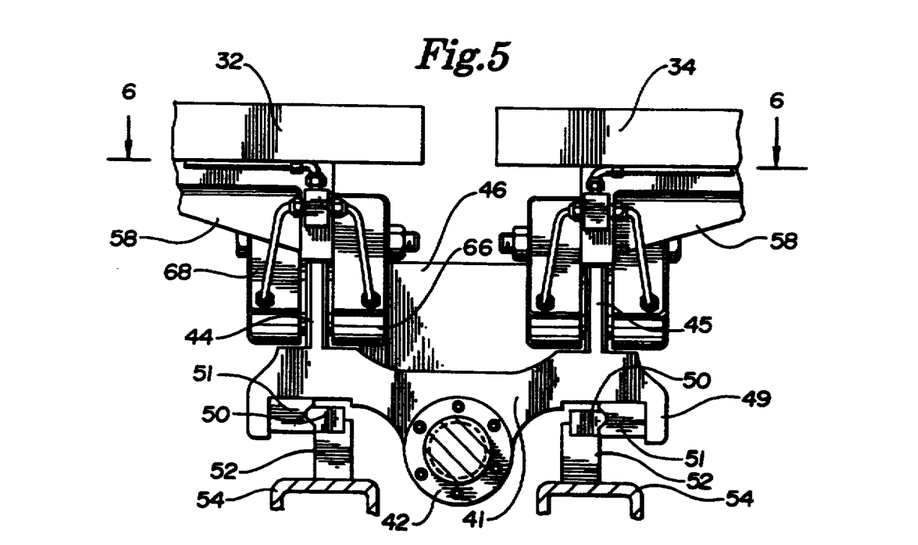
FIG. 5 is a front elevational view of the shuttle assembly and the connect/disconnect means associated with the pair of work tables.

As illustrated best FIGS. 4, 5, 6, and 7, the shuttle assembly 35 includes a shuttle having a central portion 41, a pair of generally parallel upstanding brake engaging walls 44 and 45, an end wall 46 joined with the walls 44 and 45 at their rearward ends and a pair of outwardly extending support arms 49, 49. The walls 44 and 45 extend in a direction generally parallel with the "y" axis, while the wall 46 is disposed at right angles relative to the walls 44 and 45. Each of the walls 44 and 45 is provided with a recess or female portion 48 near its rearward end and beveled or tapered edges 47 at its rearward end. A forward end of the central portion 41 is provided with a ball nut 42. The support arms 49, 49 are provided with a plurality of slide members 51 for sliding movement along the support rails 50, 50. The support or linear guide rails 50, 50 are mounted to the rail supports 52, 52 which in turn are supported by the support beams 54, 54. As illustrated best in FIG. 3, the support rails 50,50 and the support beams 54, 54 extend in the direction of the "y" axis along substantially the entire length of the apparatus. In the preferred embodiment, the slides 51 and the support guide rails 50, 50, like the slides 31 and support rails 30 of FIGS. 2, 3 and 4, are linear motion systems manufactured by THK Co., Ltd. of Tokyo, Japan, IKO Ltd or NSK Ltd of Japan.

Each of the work tables 32 and 34 is provided with a corresponding connect/disconnect means for selectively connecting and disconnecting the work tables 32 and 34 to and from the shuttle assembly 35. As illustrated in FIGS. 4, 5, 6 and 7, the connect/disconnect means 55 is associated with the work table 32, while the connect/disconnect means 56 is associated with the work table 34. Both of the connect/disconnect means 55 and 56 embody substantially identical parts. Accordingly, only the connect/disconnect means 55 will be described in detail.

Figures 9, 10, 11, 12:
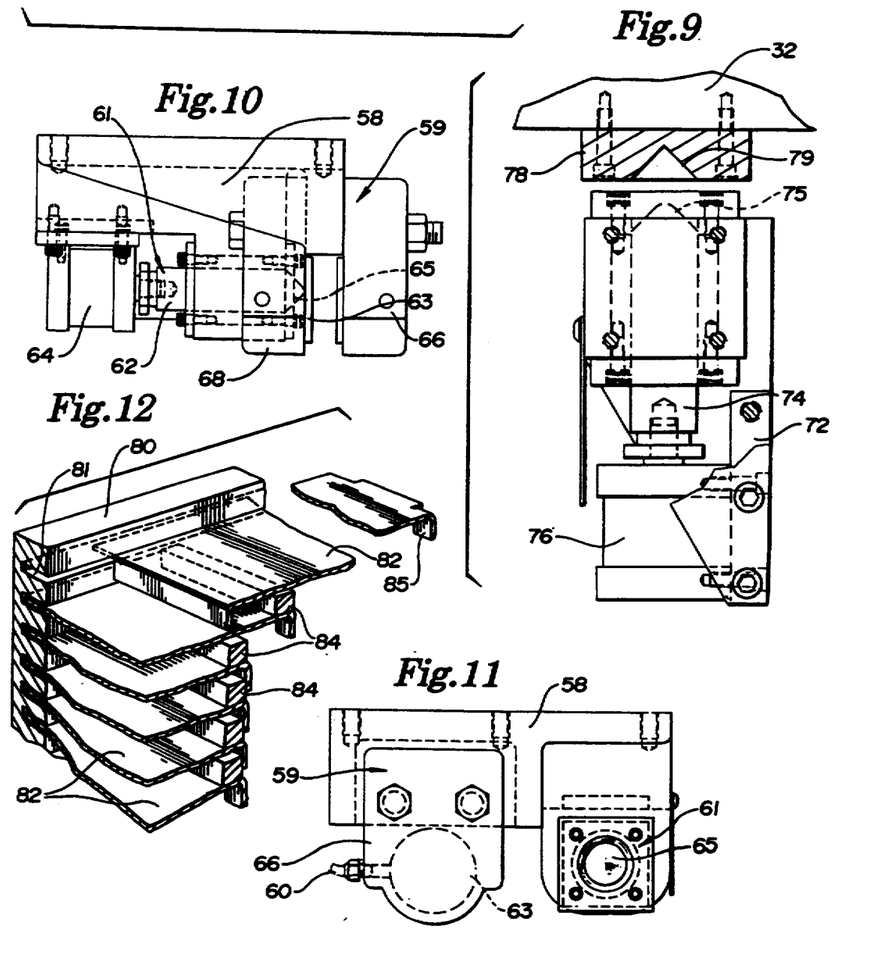
FIG. 9 is a view, partially in section, of the table lock assembly for locking the table in a fixed end position relative to the apparatus base.
FIG. 10 is a side elevational view of one of the connect/disconnect mechanisms for selectively connecting and disconnecting the corresponding work table to the shuttle assembly.
FIG. 11 is a front elevational view of the connect/disconnect mechanism of FIG. 10.
FIG. 12 is a perspective view of a portion of the waycover assembly for protecting the ball screw mechanism.

With continuing general reference to FIGS. 4–7 and specific reference to FIGS. 10 and 11, the connect/disconnect means 55 is connected with the bottom surface of its corresponding work table 32 by an appropriate bracket 58. Mounted to the bracket 58 is a brake means 59 and an alignment means 61. The brake means 59 may be a standard air or fluid actuated caliper brake having a pair of opposed brake members 66 and 68; however, the preferred embodiment contemplates a hydraulic brake means. The opposed brake members 66 and 68 are positioned on opposite sides of the brake engaging wall 44 so that upon activation of the brake assembly 59, brake pucks 63 within each of the brake members 66 and 68 engage the side surfaces of the wall 44 and essentially clamp the means 55, and thus the work table 32, to the shuttle assembly 35. The brake assembly 59 is provided with hydraulic or other fluid supply lines 60 for selectively activating and deactivating the brake. Deactivation of the brake 59 causes the pucks 63 within the brake members 66 and 68 to be withdrawn, resulting in disengagement of the pucks 63 from the side surfaces of the wall 44.

The brake assembly 59 associated with the connect/disconnect means 56 functions similarly and includes a similar components. When activated, the brake assembly 59 associated with the means 56 clamps against the side surfaces of the wall 45 to thereby connect the means 56, and thus the work table 34, to the shuttle assembly 35. When deactivated, the means 56 is disconnected from the shuttle assembly 35.

Figure 6:
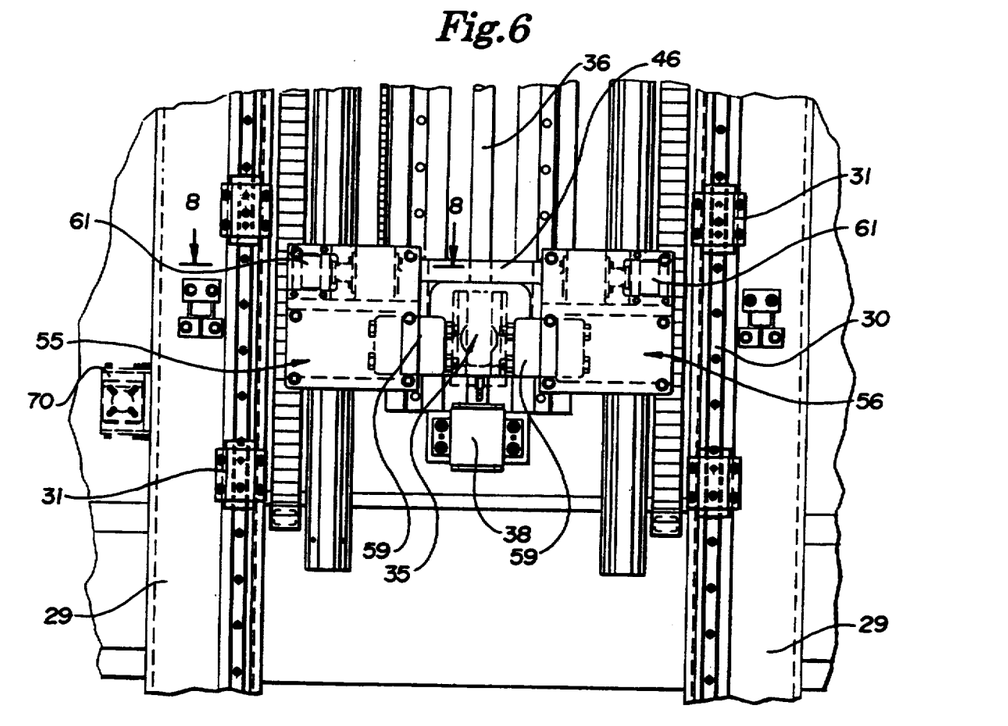
FIG. 6 is a top elevational view of the shuttle assembly and connect/disconnect means as viewed immediately below the work tables as shown by the section lines 6—6 of FIG. 4, and with the cover plates removed.
Figure 8:
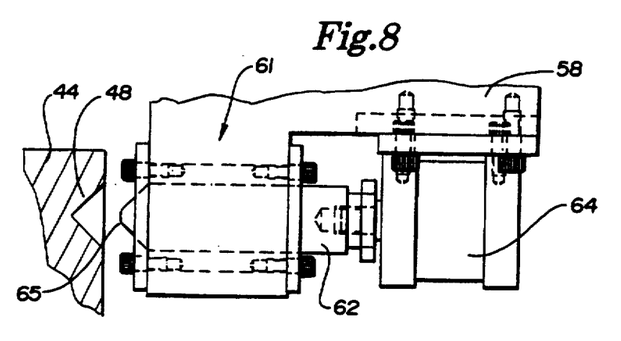
FIG. 8 is a view, partially in section, of the alignment means as viewed along the section line 8—8 of FIG. 6.

The alignment means 61 of the connect/disconnect means 55 is illustrated generally in FIGS. 4 and 6 and more specifically in FIGS. 8, 10 and 11. With reference to FIGS. 8, 10 and 11, the alignment means 61 preferably includes an elongated, air activated plunger 62 having a forward end with a protruding or tapered male portion 65 and a rearward end connected with and activated by an air or other fluid cylinder 64. Positioned on the outer surface of each of the walls 44 and 45 is a recessed or tapered female portion 48 which is adapted for engagement by the protruding portion 65. The recessed portion 48 is illustrated best in FIGS. 7 and 8. Upon activation of the air cylinder 64, the plunger 62 is moved toward the left as viewed in FIG. 8 so that the male or protruding portion 65 seats within the tapered and matched recessed portion 48. Because of the beveled surfaces of the portions 65 and 48, exact alignment between the plunger 62 and the recess 48 is obtained. This in turn insures proper and accurate alignment between the work table 32 and the shuttle assembly 35.

A similar alignment means 61 is associated with the connect/disconnect means 56 and functions to accurately align means 56, and thus the work table 34, relative to the shuttle assembly 35.

It should be noted that activation sequence of the alignment means and the brake means causes the alignment means to be activated first. If any misalignment exists, it is corrected by movement of the tapered plunger end 65 into the tapered and matched recess 48. Following alignment, the brake means is activated so that the transfer force or load between the shuttle assembly and the connect/disconnect means is carried by the brake rather than the alignment means.

Also associated with each of the work tables 32 and 34 is a table lock assembly 70 and 71, respectively. The function of each of the table locks is to selectively lock the work tables 32 and 34 in a fixed, reference position relative to the base 21. As illustrated best in FIG. 9, the table lock assemblies 70 includes a bracket 72 mounted to a portion of the base 21, an elongated plunger having an upper alignment end with a projecting or tapered male portion 75 and a lower end connected with and adapted for activation by an air cylinder 76. A table lock block 78 is connected to the bottom surface of the work table 32 and is provided with a recessed or tapered female portion 79 for engagement by the protruding portion 75 of the plunger 74. Upon activation of the air cylinder 76, the plunger 74 moves upwardly causing engagement between the protruding portion 75 and the tapered and matched recessed portion 79, thereby locking the work table 32 in a fixed position relative to the base 21. When the air cylinder 76 is deactivated, the plunger 74 is retracted and the work table 32 is free to be moved. The table lock assembly 71 is similar to the table lock assembly 70 described above and includes an associated table lock block connected to the bottom surface of the work table 34. Appropriate activation or deactivation of the lock assembly 71 results in selected locking or unlocking the work table 34 relative to the base 21. In the preferred embodiment, locking a particular table and releasing the alignment plunger for that table occurs simultaneously. Similarly, unlocking a particular table and activating the alignment plunger for that table occurs simultaneously.

FIG. 12 illustrates a waycover assembly for preventing machining scraps and other material from falling onto or otherwise interfering with the ball screw 36. The waycover assembly includes a support 80 having a plurality of lateral slide grooves 81 and a plurality of slidable stacking plates or covers 82. The plates 82 are provided with a plurality of tabs 84 and members 85 which function to expand and collapse the assembly in response to movement of the shuttle in a manner known in the art. A separate set of plates 82 is provided both ahead and behind the shuttle so that the ball screw is covered regardless of the position of the shuttle.

Having described the structural details of the apparatus of the present invention, the use and operation can be best understood as follows. First, the apparatus is prepared for use. This includes providing the spindles with the desired tool heads and/or bits and manually positioning or adjusting the spindles relative to the carriages 11 and 12 and relative to one another. The control means 17 is also programmed to control the various movements of the apparatus in a matter known in the art. One or more workpieces are then positioned on and secured to one of the work tables 32 or 34 and a machining cycle is initiated. Such machining cycle involves activation of the connect/disconnect means associated with the work table carrying the workpiece 13 (for example work table 32). This results in alignment of the work table 32 with the shuttle assembly 35 by activation of the alignment means 61, followed by a clamping of the work table 32 to the shuttle assembly 35 by activation of the brake assembly 59. As discussed above, the alignment means 61 is activated prior to the activation of the brake assembly 59.

The machining cycle is then continued with the table 32 being selectively moved along the "y" axis 27 by the shuttle assembly 35 and the movement of the tool heads or bits being selectively moved along the "x" and "z" axes. While the machining operation is being performed on the workpiece 13 attached to work table 32, the work table 34 is locked in a fixed, stationary position at the forward end of the apparatus. Thus, additional workpieces 13 can be mounted to the work table 34 while machining is being performed on the workpieces 13 of the table 32. When the machining of the workpieces 13 on the work table 32 is completed, the work table 32 is moved to the forward end, locked in position by the table lock assembly 70 and the connect/disconnect means 55 deactivated. The connect/disconnect means 56 associated with the table 34 is then activated and the table lock assembly 71 deactivated so that the machining operation can begin with respect to the workpieces 13 on the work table 34. While this is occurring, the finished workpieces can be removed from the work table 32 and new workpieces mounted thereon. By alternately machining and mounting workpieces relative to the work tables 32 and 34, the downtime of the apparatus can be significantly reduced or eliminated.

Also, if desired, both of the work tables 32 and 34 can be connected with the shuttle assembly 35 and moved in synchronous movement along the "y" axis. This would be appropriate for the machining of a large workpiece which may be supported by both work tables 32 and 34.

Although the description of the preferred embodiment has been quite specific, it has been contemplated that various modifications could be made without deviating from the spirit of the present invention. Accordingly, it is contemplated that the scope of the present invention be dictated by the appended claims, rather than by the description of the preferred embodiment.

We claim:

1. An apparatus for performing selected machining functions relative to a workpiece comprising:

a machine carriage assembly having means for selectively moving a machining bit along first and second axes relative to said workpiece, said first and second axes being orthogonal relative to one another, and a work table assembly for supporting said workpiece and for selectively moving said workpiece along a third axis, said third axis being orthogonal relative to each of said first and second axes and said work table assembly comprising:

first and second work tables disposed in side-by-side relationship and moveable relative to one another along said third axis, a shuttle selectively moveable along said third axis, first means associated with said first work table for selectively aligning and connecting and disconnecting said first work table relative to said shuttle, second means associated with said second work table for selectively aligning and connecting and disconnecting said second work table relative to said shuttle, and single transport means connected with said shuttle for selectively moving said shuttle along said third axis, wherein at least one of said first and second connect/disconnect means includes connect/disconnect means for selectively connecting and disconnecting the corresponding work table relative to said shuttle and separate alignment means for aligning the corresponding work table shuttle, wherein said connect/disconnect means include a brake for selectively connecting the corresponding work table to said shuttle, wherein said alignment means include a male portion and a corresponding female portion that have means for selectively moving one of said male and female portions into and out of aligning engagement with the other, wherein said means for selectively moving one of said portions include an air actuated cylinder mounted to said corresponding work table, and wherein said shuttle includes a pair of generally parallel brake engaging walls and wherein said female portion is formed within one of said walls.

2. The apparatus of claim 1 wherein said shuttle includes an end wall joining said brake engaging walls near the point at which said female portion is formed, 3. An apparatus for performing selected machining functions relative to a workpiece comprising:

a machine carriage assembly having means for selectively moving a machining bit along first and second axes relative to said workpiece, said first and second axes being orthogonal relative to one another, and a work table assembly for supporting said workpiece and for selectively moving said workpiece along a third axis, said third axis being orthogonal relative to each of said first and second axes and said work table assembly comprising:

first and second work tables disposed in side-by-side relationship and moveable relative to one another along said third axis, a shuttle selectively moveable along said third axis, first means associated with said first work table for selectively aligning and connecting and disconnecting said first work table relative to said shuttle, second means associated with said second work table for selectively aligning and connecting and disconnecting said second work table relative to said shuttle, and single transport means connected with said shuttle for selectively moving said shuttle along said third axis, wherein each of said first and second means includes brake means having a brake engaging surface connected with one of said corresponding work tables and said shuttle and a brake member connected with the other of said corresponding work tables and said shuttle.

4. The apparatus of claim 3 wherein said brake surface is connected with said shuttle.

5. The apparatus of claim 3 wherein said brake member is a caliper brake.

6. An apparatus for performing selected machining functions relative to a workpiece comprising:

a machine carriage assembly having means for selectively moving a machining bit along first and second axes relative to said workpiece, said first and second axes being orthogonal relative to one another, and a work table assembly for supporting said workpiece and for selectively moving said workpiece along a third axis, said third axis being orthogonal relative to each of said first and second axes and said work table assembly comprising:

first and second work tables disposed in side-by-side relationship and moveable relative to one another along said third axis, a shuttle selectively moveable along said third axis, first means associated with said first work table for selectively aligning and connecting and disconnecting said first work table relative to said shuttle, second means associated with said second work table for selectively aligning and connecting and disconnecting said second work table relative to said shuttle, and single transport means connected with said shuttle for selectively moving said shuttle along said third axis, wherein each of said first and second means includes alignment means for aligning the corresponding table relative to said shuttle and brake means for connecting the corresponding table relative to said shuttle and wherein the apparatus further includes control means for selectively and separately activating and deactivating said alignment means and said brake means.

* * * * *